(12) United States Patent
Schödler

(10) Patent No.: US 8,003,148 B2
(45) Date of Patent: Aug. 23, 2011

(54) DEVICE AND METHOD FOR FROTHING AND STEAMING MILK

(75) Inventor: Claudio Schödler, Lenzburg (CH)

(73) Assignee: Cafina AG (CH)

( * ) Notice: Subject to any disclaimer, the term of this patent is extended or adjusted under 35 U.S.C. 154(b) by 364 days.

(21) Appl. No.: 12/191,351

(22) Filed: Aug. 14, 2008

(65) Prior Publication Data

US 2009/0047402 A1 Feb. 19, 2009

(30) Foreign Application Priority Data

Aug. 16, 2007 (CH) .................................. 1290/07

(51) Int. Cl.
*A47J 31/40* (2006.01)
(52) U.S. Cl. .......... 426/474; 426/519; 426/569; 99/453; 99/293; 99/323.1
(58) Field of Classification Search .................. 426/474, 426/519, 569; 99/453, 293, 323.1
See application file for complete search history.

(56) References Cited

U.S. PATENT DOCUMENTS

| 4,715,274 | A | | 12/1987 | Paoletti |
| 5,330,266 | A | * | 7/1994 | Stubaus ........................ 366/101 |
| 6,786,138 | B2 | * | 9/2004 | Johnson et al. .............. 99/323.1 |
| 6,901,848 | B2 | | 6/2005 | Beretta |
| 7,600,467 | B2 | * | 10/2009 | Coccia et al. .................... 99/293 |

* cited by examiner

*Primary Examiner* — Anthony Weier
(74) *Attorney, Agent, or Firm* — Moginot, Moore & Beck, LLP

(57) ABSTRACT

A device for frothing and steaming milk has a steamer (1) and a steamer tube (3) connected to a steam conduit (2). The steam conduit (2) is provided with an air feeder port (6) which can be closed off. The steamer tube (3) has a temperature sensor (11) for sensing the milk temperature. The device has furthermore a controller (13) devised to open/close the air feeder port (6) as a function of the operating mode and/or sensed milk temperature. When the milk is steamed the air feeder port (6) remains closed whilst when frothing the milk it normally firstly remains closed until opened at a predefined milk temperature so that air can be mixed in the flow of steam.

22 Claims, 1 Drawing Sheet

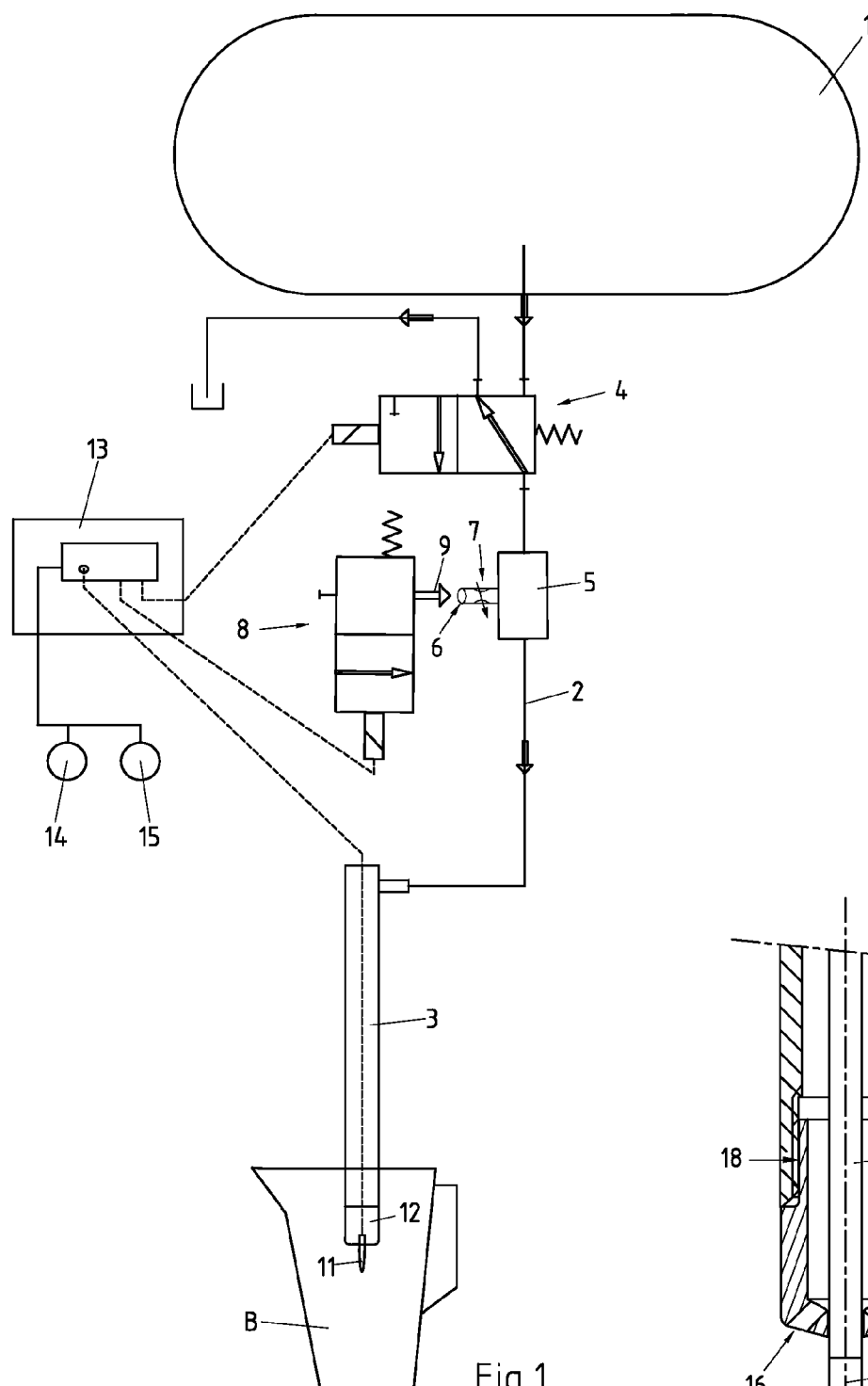
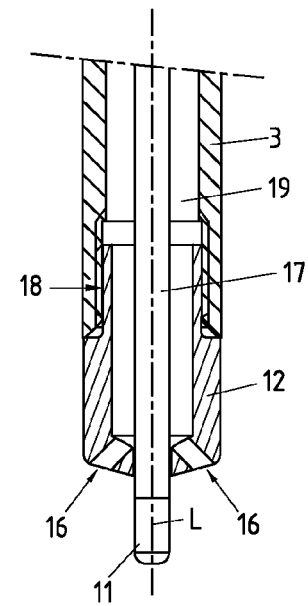
Fig.1
Fig.2

DEVICE AND METHOD FOR FROTHING AND STEAMING MILK

BACKGROUND

The invention relates to a device for frothing and steaming milk as well as to methods for frothing and steaming milk.

Such devices find application especially or together with espresso coffee machines. The milk froth created by the device is used for example in producing a cappuccino or latte whilst the steamed milk may be used both in preparing milk coffee as well as hot milk beverages.

Known devices usually feature a pivotably mounted steamer tube ending in a nozzle for jetting the steam. Jetting is started and stopped by means of a rotary switch or the like. To heat the milk the steamer tube is usually inerted relatively deeply into the receptacle containing the milk and the steam feed initiated. The steaming action is terminated as judged by the operator, the barista. To froth the milk the steamer tube is inserted into the milk just enough so that the jet of steam can entrain ambient air which ultimately is responsible for the frothing. Thus, how good the resulting milk froth is, depends on the expertise of the barista. When creating milk froth too, frothing is terminated as judged by the barista.

In addition to these simple devices fully automatic emulsifier units are known in which a steam feed conduit connected to the steamer ports into a suction chamber. This suction chamber is connected to a milk feed conduit and an air feed conduit. The flow of steam creates a negative pressure in the suction chamber causing the milk to be drawn into the suction chamber via the milk feed conduit and air via the air feed conduit. This steam/air/milk mixture is transformed into a turbulent flow in a subsequent emulsifier chamber, resulting in a hot emulsion of milk and air. One such emulsifier unit is known for example from EP-A-0 195 750.

However, fully automatic emulsifiers are relatively complicated and thus expensive to manufacture. On top of this, they tend to become soiled, making frequent cleaning a nuisance because the components coming into contact with the milk are not readily accessible from without and thus cannot be cleaned by hand. Apart from this, the milk has to be held in a separate, preferably chilled compartment or receptacle.

Disclosed in German patent DE 602 15 058 T2 is a device for steaming and frothing milk. The device comprises a calorifier connected via a first pipe—the steam pipe—to a delivery pipe. Inerted in addition in the steam pipe is a shutoff valve. The delivery pipe has an open end for immersing in a receptacle containing milk. the device comprises furthermore an electrically powered pump for feeding the air pressurized. The pump is connected via a second pipe to the delivery pipe. In conclusion, a temperature sensor is provided connected to the immersible end of the delivery pipe to serve sensing the temperature of the milk. In an alternative aspect the steam pipe is additionally provided with a bypass pipe to bypass the shutoff valve.

SUMMARY

One object of the invention is to configure a device for frothing and steaming milk, such that a good quality of the created finished product, particularly of the created milk froth, is assured whilst also making it possible to heat the milk without it being frothed, the device excelling by being simply structured, easy to operate and cost-effective to manufacture.

For this purpose a device in accordance with one embodiment, the invention is provided with a steamer, a steam conduit connecting the steamer to a steamer tube for insertion into the milk, a temperature sensor arranged on the steamer tube for sensing the milk temperature and a controller connected to the temperature sensor, characterized in that included in the steam conduit is a venture nozzle provided with an air feeder port selectively closeable by means of the controller.

Further embodiments of the device are characterized by one or more of the following features. In one feature, the device comprises an externally activated closure means for closing off the air feeder port the controller actuating the closer means as a function of the mode operation and/or the sensed milk temperature. The closure means may be electromagnetically actuatable.

In certain embodiments, the controller controls the closure means such that the air feeder port is closed when steamed milk is created. In other embodiments, the controller activates the closure means such that the air feeder port is closed off when initially frothing the milk to then open the air feeder port once a predefined milk temperature is attained.

The closure means may include a spring-loaded closure element for closing off the air feeder port, the closure element being devised to close off the air feeder port in the active operating position whilst releasing the air feeder port by spring force in the non-active operating position.

The temperature sensor may be arranged in the region of the tip of the steamer tube. The temperature sensor may protrude beyond the steamer tube axially. In one aspect, the steamer tube may be provided with a nozzle member at one end from which steam can be jetted at an angle to the longitudinal centerline of the steamer tube. The longitudinal centerline of the temperature sensor may be arranged coaxial to the longitudinal centerline of the steamer tube. The nozzle member may further be configured to mount the temperature sensor.

In another aspect, the device may include arranged in the steam conduit upstream of the venturi nozzle an electromechanically actuatable valve (4) which is connected to the controller, the valve being devised to close off the output of the steamer in the OFF position and to simultaneously connect the steam conduit to the atmosphere.

Defined furthermore is a method of frothing milk using the device described above characterized in the with the air feeder port closed the milk is heated by means of steam supplied via the steam conduit to a predefined milk temperature and that on attaining this temperature the air feeder port is opened and frothing continued by means of steam aggregated with air.

A preferred further embodiment of the method is characterized in that the temperature of the milk is monitored and frothing halted by stopping the steam supply when a predefined final temperature is attained.

The inventor further contemplates a method of steaming milk using the device described above, characterized in that with the closure means closed, the milk is heated by means of steam supplied via the steam conduit to a predefined milk temperature and steaming discontinued when this temperature is attained. In further embodiment a coffee machine is provided with a device configured as described above characterized in that the steamer tube is mounted pivotable and/or height-adjustable on the coffee machine.

DESCRIPTION OF THE FIGURES

A preferred example aspect of the invention will now be described with reference to the drawings in which:

FIG. 1 is a diagrammatic illustration of the device for frothing and steaming milk, and FIG. 2 is a cross-section through the front end of the steamer tube shown magnified.

DESCRIPTION OF THE EMBODIMENTS

Referring now to FIG. 1 there is illustrated diagrammatically a device for frothing and steaming milk for detaining the basic configuration of the device. The device comprises a steamer 1 connected via a steam conduit 2 to a steamer tube 3. Arranged in the steam conduit 2 is an electromagnetically actuatable valve 4 followed downstream by a venturi nozzle 5 provided with an air feeder port 6 is can be closing off selectively, i.e as a function of the wanted operating mode. The air feeder port 6 can be closed off by means of an electromagnetically actuator 8, a closure element 9 being provided as the actual closing off part which is displaceable to open and close the air feeder port 6. The closure element 9 of the actuator 8 is biased by means of a spring (not shown) so that in the non-active operating condition it is located in its retracted resting position whilst when the actuator 8 is activated the closure element 9 is in its extended active position in which the air feeder port 6 is closed off. In the present example the closure element 9 is in its retracted resting position in which it opens up the air feeder port 6.

The venturi nozzle 5 is provided with an adjustable restrictor 7 by means of which the size of the air feeder port 6 can be adjusted. By means of this restrictor 7 the amount of air induced per unit of time and thus especially the consistency of the generated milk froth can be varied. The restrictor 7 can be set, for example, manually or electromechanically.

The steam conduit 2 ports radially into the rear end of the steamer tube 3. In the region of the tip the steamer tube 3 is provided with a temperature sensor 11 which protrudes beyond the steamer tube 3 axially. The tip of the steamer tube 3 forms a nozzle member 12 featuring a plurality of jetting orifices as detained further below with reference to FIG. 2.

The device features furthermore an electronic controller 13 electrically connected to the valve 4, to the actuator 8 as well as to the temperature sensor 11. Where the restrictor 7 is electromagnetically actuatable it may also be connected to the controller 13. To start the steaming/frothing action two buttons 14, 15 are provided which are likewise electrically connected to the controller 13. Designated B in conclusion is a receptacle serving to accommodate the milk to be steamed/frothed. In the OFF position as shown the valve 4 is in its vent position in which the steam conduit 2 is connected to the atmosphere. In this vent position the valve 4 simultaneously closes also the steam outlet of the steamer 1.

The function of the device is as follows:

1. Steaming Milk

To steam milk the tip of the steamer tube 3 is immersed in the milk (not shown) held in the receptacle B. the steamer tube 3 is to be immersed in the milk sufficiently so that the steam outlet or orifices is/are immersed in the milk by a few centimeters so that the steam jetted by the nozzle cannot entrain ambient air. Pressing the button 14 then starts the steaming action by the controller 13 opening the valve 4 so that steam flows from the steamer 1 via the open valve 4 and the steam conduit 2 into the steamer tube 3 to be jetted from the end nozzle thereof. The air feeder port 6 of the venturi nozzle 5 is closed off by the closure element 9 so that no air can be drawn in by the steam stream.

The steam jetted by the steam outlet orifices heats the milk, the temperature of which is continuously sensed by means of the temperature sensor 11. As soon as the milk has attained a predefined temperature, for example 75° C., the steam feed is automatically discontinued and the steaming action terminated. For this purpose the valve 4 is closed by the controller 13 and the steam conduit 2 reopened to the atmosphere. The temperature at which the steaming action is terminated can usually be set by the operator within certain limits, 90° C. being a maximum for the milk temperature. On termination of the steaming action the tip 12 of the steamer tube 3 as well as the axially protruding temperature sensor 11 can be simply wiped clean with a moist cloth.

2. Frothing Milk

To froth the milk the tip of the steamer tube 3 is immersed in the milk (not shown) held in the receptacle. The steamer tube 3 is again to be immersed in the milk so that the steam outlet or orifices is/are immersed in the milk by a few centimeters so that the steam jetted by the nozzle cannot entrain ambient air. Pressing the button 15 then starts the frothing action by the controller 13 opening the valve 4 so that steam flows from the steamer 1 via the open valve 4 and the steam conduit 2 into the steamer tube 3 to be jetted from orifices machined in the nozzle body 12. The air feeder port 6 of the venturi nozzle 5 is closed off by the closure element 9 so that no air can be drawn in by the throughflow of steam.

The steam jetted from the nozzle body 12 heats the milk, the temperature of which is continuously sensed by means of the temperature sensor 11. As soon as the milk has attained a predefined minimum temperature, for example 30° C., the actuator 8 is activated so that its closure element 9 is unseated from the air feeder port 6 of the venturi nozzle 5 to open up the air feeder port 6. Up to this point in time the milk is just steamed without froth being generated. Once the air feeder port 6 is opened up the steam flowing through the venturi nozzle 5 draws in air via the air feeder port 6. Since the way in which venturi nozzles work is well known, no details are needed here. But, in any case, the intake air is mixed in the venturi nozzle 5 with the steam, resulting in a mixture of steam and air being jetted from the nozzle member 12, generating milk froth. As soon as the milk has attained a predefined temperature, for example 65° C., the steam feed is automatically discontinued and the frothing action terminated. For this purpose again the valve 4 is closed by the controller 13 and the steam conduit 2 reopened to the atmosphere. In this case too, the temperature at which the frothing action is terminated can usually be set by the operator within certain limits, 90° C. being a maximum for the milk temperature. On termination of the frothing action the nozzle member 12 of the steamer tube 3 as well as the axially protruding temperature sensor 11 can be simply wiped clean with a moist cloth.

Experience has shown that to froth the milk it is particularly of advantage to steam the milk to a predefined temperature when the milk at the start of the frothing action is still relatively cold, because with cold milk frothing is deficient or the froth cannot be generated homogenously. Since the milk is usually held chilled its temperature at the start of frothing is, as a rule, around 5° C.

The controller 13 is preferably devised to discontinue the steaming action or frothing action at any time simply by the corresponding buttons 14, 15 being pressed. Preferably each action can also be extended simply by repressing the corresponding button within a predefined time duration, for example 5 secs after termination of the steaming action or frothing action. Repressing the button causes in this case the milk to be steamed by a predefined temperature difference, for example 3° C. above the preprogrammed wanted temperature. In the steaming action the milk is steamed by the cited temperature difference whilst in the frothing action air is also added, where necessary.

Referring now to FIG. 2 there is illustrated a cross-section through the tip of the steamer tube 3 shown magnified. The steamer tube 3 ends in a nozzle member 12 comprising a plurality of jetting orifices 16 via which steam can be jetted at an angle to the longitudinal centerline L of the steamer tube 3 or of the temperature sensor 11. This jetting angle is selected so that the milk is steamed/frothed homogenously, on the one hand, and that, on the other, the jetted steam does not impact the temperature sensor 11 to avoid it falsifying temperature sensing. The longitudinal centerline of the temperature sensor 11 is oriented coaxial to the longitudinal centerline of the steamer tube 3. At its rear end the nozzle member 12 is provided with a male thread 18 by means of which it is screwed secure to the steamer tube 3. At the tip the nozzle member 12 features a central hole serving to locate the temperature sensor 11. The temperature sensor 11 is secured to the tubular element 17, the interior of which guides the electrical leads connecting the temperature sensor 11. The steam is jetted through the annular space 19 between the tubular element 17 and the inner side of the tubular steamer tube 3, passing the steamer tube 3 to the jetting orifices 16. The temperature sensor may be, for example, a thermoelement or a thermistor NTC resistor sensor.

The device as described is particularly suitable for use with or in an espresso coffee machine on which the steamer tube is mounted preferably pivotable and/or height-adjustable on the coffee machine.

The invention claimed is:

1. A device for frothing and steaming milk including a steamer (1), a steam conduit (2) connecting the steamer (1) to a steamer tube (3) for insertion into the milk, a temperature sensor (11) arranged on the steamer tube (3) for sensing the milk temperature and a controller (13) connected to the temperature sensor (11), and further comprising:
   a venturi nozzle (5) defined in the steam conduit (2), said venturi nozzle provided with an air feeder port (6) selectively closable by means of the controller (13);
   an externally activated closure means (8) for closing off the air feeder port (6), the controller (13) configured to actuate the closure means (8) as a function of the mode of operation and/or the sensed milk temperature, characterized in that the closure means (8) includes a spring-loaded closure element (9) for closing off the air feeder port (6), the closure element (9) being configured and arranged to close off the air feeder port (6) in the active operating position whilst releasing the air feeder port (6) by spring force in the non-active operating position.

2. The device as set forth in claim 1, characterized in that the closure means (8) is electromagnetically actuatable.

3. The device as set forth in claim 1, characterized in that the controller (13) is configured to control the closure means (8) such that the air feeder port (6) is closed when steamed milk is created.

4. The device as set forth in claim 1, characterized in that the controller (13) is configured to activate the closure means (8) such that the air feeder port (6) is closed off when initially frothing the milk to then open the air feeder port (6) once a predefined milk temperature is attained.

5. The device as set forth in claim 1, characterized in that the temperature sensor (11) is arranged in the region of the tip of the steamer tube (3).

6. The device as set forth in claim 1, characterized in that the temperature sensor (11) protrudes beyond the steamer tube (3) axially.

7. The device as set forth in claim 1, characterized in that the steamer tube (3) is provided with a nozzle member (12) at one end from which steam can be jetted at an angle to the longitudinal centerline (L) of the steamer tube (3).

8. The device as set forth in claim 7, characterized in that the longitudinal centerline (L) of the temperature sensor (11) is arranged coaxial to the longitudinal centerline (L) of the steamer tube (3) and that the nozzle member (12) is configured to mount the temperature sensor (11).

9. A method for frothing milk using a device as set forth in claim 1, characterized in that with the air feeder port (6) closed the milk is heated by means of steam supplied via the steam conduit (2) to a predefined milk temperature and that on attaining this temperature the air feeder port (6) is opened and frothing continued by means of steam aggregated with air.

10. The method as set forth in claim 9, characterized in that the temperature of the milk is monitored and frothing halted by stopping the steam supply when a predefined final temperature is attained.

11. A method for steaming milk using a device in accordance with claim 1, characterized in that with the closure means (8) closed, the milk is heated by means of steam supplied via the steam conduit (2) to a predefined milk temperature and steaming discontinued when this temperature is attained.

12. A coffee machine comprising a device configured as set forth in claim 1, characterized in that the steamer tube (3) is mounted pivotable and/or height-adjustable on the coffee machine.

13. The coffee machine as set forth in claim 12, characterized in that the temperature sensor (11) is arranged in the region of the tip of the steamer tube (3).

14. The coffee machine as set forth in claim 12, characterized in that the temperature sensor (11) protrudes beyond the steamer tube (3) axially.

15. The coffee machine as set forth in claim 12, characterized in that the steamer tube (3) is provided with a nozzle member (12) at one end from which steam can be jetted at an angle to the longitudinal centerline (L) of the steamer tube (3).

16. The coffee machine as set forth in claim 15, characterized in that the longitudinal centerline (L) of the temperature sensor (11) is arranged coaxial to the longitudinal centerline (L) of the steamer tube (3) and that the nozzle member (12) is configured to mount the temperature sensor (11).

17. The device as set forth in claim 1, characterized in that the closure means (8) is electromagnetically actuatable.

18. A device for frothing and steaming milk including a steamer (1), a steam conduit (2) connecting the steamer (1) to a steamer tube (3) for insertion into the milk, a temperature sensor (11) arranged on the steamer tube (3) for sensing the milk temperature and a controller (13) connected to the temperature sensor (11), and further comprising:
   a venturi nozzle (5) defined in the steam conduit (2), said venturi nozzle provided with an air feeder port (6) selectively closable by means of the controller (13);
   an electromechanically actuatable valve (4) arranged in the steam conduit (2) upstream of said venturi nozzle (5), said valve (4) connected to the controller (13) and being configured and arranged to close off the output of the steamer (1) in the OFF position and to simultaneously connect the steam conduit (2) to the atmosphere.

19. The device as set forth in claim 18, characterized in that the device comprises an externally activated closure means (8) for closing off the air feeder port (6), the controller (13) configured to actuate the closure means (8) as a function of the mode of operation and/or the sensed milk temperature.

20. The device as set forth in claim 19, characterized in that the closure means (8) is electromagnetically actuatable.

21. The device as set forth in claim 19, characterized in that the controller (13) is configured to activate the closure means (8) such that the air feeder port (6) is closed off when initially frothing the milk to then open the air feeder port (6) once a predefined milk temperature is attained.

22. The device as set forth in claim 19, characterized in that the controller (13) is configured to control the closure means (8) such that the air feeder port (6) is closed when steamed milk is created.

\* \* \* \* \*